(12) United States Patent
Kizumi et al.

(10) Patent No.: US 9,771,068 B2
(45) Date of Patent: Sep. 26, 2017

(54) RUNNING-SUPPORT SYSTEM AND RUNNING-SUPPORT METHOD

(71) Applicant: HONDA MOTOR CO., LTD., Tokyo (JP)

(72) Inventors: Yuki Kizumi, Wako (JP); Yosuke Sakamoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/074,816

(22) Filed: Mar. 18, 2016

(65) Prior Publication Data

US 2016/0311428 A1 Oct. 27, 2016

(30) Foreign Application Priority Data

Apr. 23, 2015 (JP) .................................. 2015-088442

(51) Int. Cl.
*B60W 30/045* (2012.01)
*G01C 21/26* (2006.01)
*B62D 15/02* (2006.01)

(52) U.S. Cl.
CPC ......... *B60W 30/045* (2013.01); *B62D 15/025* (2013.01); *G01C 21/26* (2013.01); *B60W 2550/143* (2013.01); *B60W 2710/20* (2013.01)

(58) Field of Classification Search
CPC .................................................. B60W 30/045
See application file for complete search history.

(56) References Cited

U.S. PATENT DOCUMENTS

| | | | | |
|---|---|---|---|---|
| 2009/0265062 A1* | 10/2009 | Nguyen Van | ........ | B62D 15/025 701/42 |
| 2015/0274163 A1* | 10/2015 | Terazawa | .............. | B60W 10/20 701/41 |
| 2016/0229399 A1* | 8/2016 | Wada | .................... | B60W 30/12 |
| 2016/0288785 A1* | 10/2016 | Ezoe | .................. | B60W 40/072 |

FOREIGN PATENT DOCUMENTS

| JP | 2001-101597 A | 4/2001 |
|---|---|---|
| JP | 2003-327012 A | 11/2003 |

* cited by examiner

*Primary Examiner* — Adam Tissot
*Assistant Examiner* — Michael Berns
(74) *Attorney, Agent, or Firm* — Chip Law Group

(57) ABSTRACT

There is provided a running-support system and a running-support method capable of providing more suitable running support at the time of turning a curve. In the running-support system or the running-support method, a steering-support section provides steering support using at least one of a piece of map information on a curve and a lane image picked up by an image pickup section at the time of turning the curve. The steering-support section suppresses the steering support without being based on the piece of map information when the steering-support section detects an end point of the curve on the basis of the lane image.

9 Claims, 13 Drawing Sheets

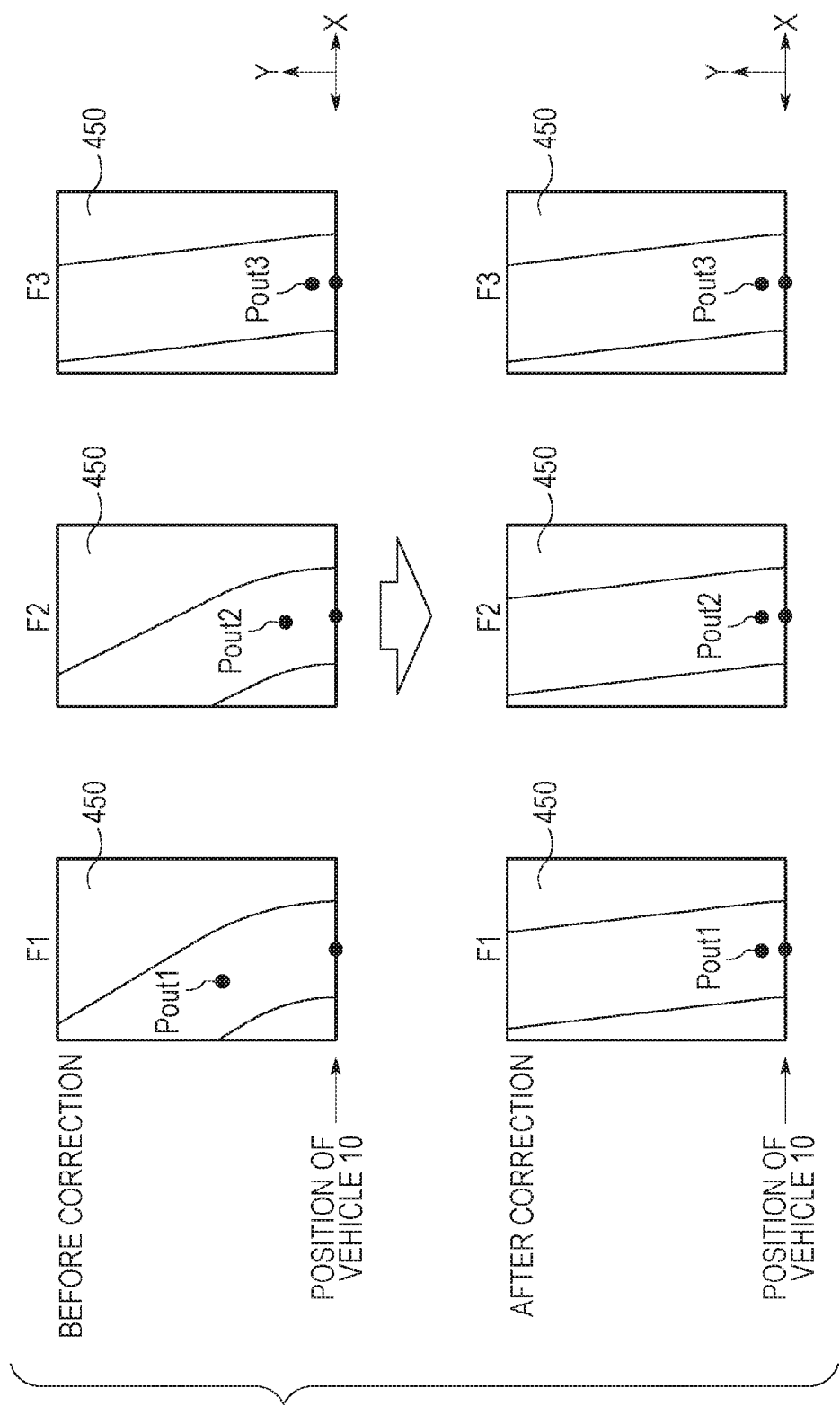

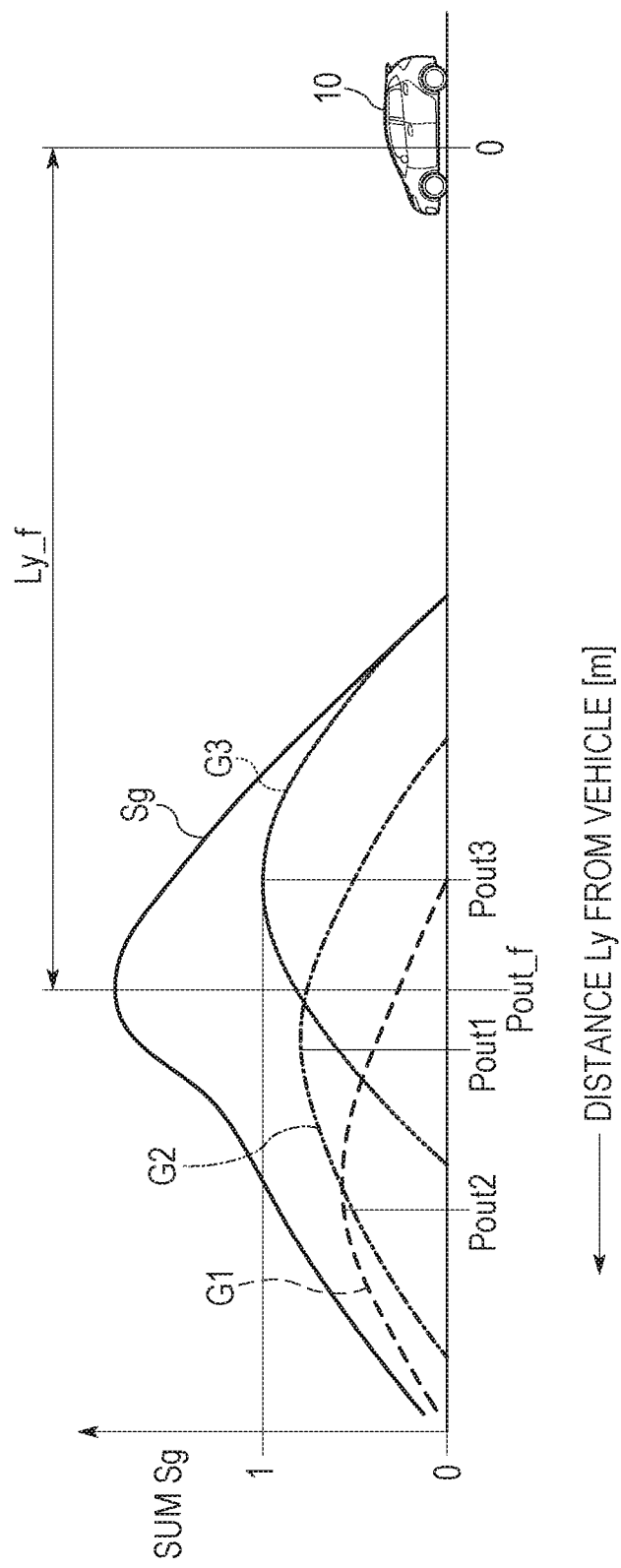

RUNNING-SUPPORT SYSTEM AND RUNNING-SUPPORT METHOD

CROSS REFERENCES TO RELATED APPLICATIONS

The present application claims priority under 35 U.S.C. §119 to Japanese Patent Application No. 2015-088442, filed Apr. 23, 2015, entitled "Running-Support System and Running-Support Method." The contents of this application are incorporated herein by reference in their entirety.

BACKGROUND

1. Field

The present disclosure relates to a running-support system and a running-support method for providing steering support at the time of curve turning.

2. Description of the Related Art

Japanese Unexamined Patent Application Publication No. 2003-327012 is aimed at obtaining a running control apparatus for a vehicle that is capable of performing turning and acceleration of a vehicle on a curved road in conjunction with each other and allows smooth running without any uncomfortable feeling (paragraph [0006] and Abstract). To accomplish the aim, in Japanese Unexamined Patent Application Publication No. 2003-327012, when any of a steering angle detected by a steering angle detection section 6, a yaw rate detected by a yaw rate detection section 11, or the curvature of a road ahead recognized by a lane recognition section 1 turns down after a vehicle decelerates from a preset vehicle velocity at the time of running on a curved road, the running control apparatus for a vehicle accelerates the vehicle to the preset vehicle velocity through acceleration control corresponding to a reduction in the parameter (Abstract).

In Japanese Unexamined Patent Application Publication No. 2003-327012, at which one of an entrance of a curved road, an exit, and a straight portion a vehicle is running is judged on the basis of a steering angle, a yaw rate, and a lane shape (the curvature of a road) (paragraph [0026]). The lane recognition section 1 is composed of a vehicle-mounted camera 2 and an image processing apparatus 3 (paragraph [0019]).

Japanese Unexamined Patent Application Publication No. 2001-101597 is aimed at providing a road shape recognition method capable of obtaining an accurate curve shape (paragraph [0012]). To accomplish the aim, in Japanese Unexamined Patent Application Publication No. 2001-101597, the shape of a curve included in a road is recognized using a plurality of pieces of point data (FIG. 1(a)) arranged along the road. A rough shape of the curve, that is, an entering line and a leaving line of the curve are obtained on the basis of the plurality of pieces of point data (FIG. 1(c)). A piece of information on a representative shape of the curve is obtained from a piece of information on the rough shape and pieces of point data within the curve. Preferably, circular arcs passing through respective points within the curve and inscribed inside the entering line and the leaving line are individually obtained (FIG. 1(d)). The representative circular arc shape of the curve is obtained from the plurality of circular arcs by statistical processing (FIG. 1(e)) (Abstract).

The plurality of pieces of point data (FIG. 1(a)) in Japanese Unexamined Patent Application Publication No. 2001-101597 are based on a piece of map data of a navigation apparatus or the like (paragraphs [0024] and [0039]). At the time of recognition of the shape of the curve, a curve start point and a curve end point are obtained (FIG. 1(b) and paragraph [0026]). The curve end point is obtained on the basis of the amount of change in bearing at each point and distances between points (claim 6, paragraphs [0048] to [0054], and FIGS. 12 to 14).

SUMMARY

As described above, in Japanese Unexamined Patent Application Publication No. 2003-327012, the curvature of a road is used (Abstract and paragraph [0026]). If the curvature of a road is used, the time needed to judge an exit (end point) of a curve with a small radius or a curve with a lane only on one side may be long or the judgment of the exit may be impossible.

In Japanese Unexamined Patent Application Publication No. 2001-101597, a curve end point is obtained using pieces of point data based on a piece of map data of a navigation apparatus or the like (paragraphs [0024], [0026], and [0039] and FIG. 1(b)). If a piece of map data is used, an error in detection of the current position of a vehicle may cause a failure to accurately judge a curve end point.

The present application has been made in view of the above-described problems and describes provision of a running-support system and a running-support method capable of providing more suitable running support at the time of turning a curve.

A running-support system according to the present application includes a map information acquisition section that acquires a piece of map information on a curve, an image pickup section that picks up a lane image that is an image of at least one lane ahead of a vehicle, and a steering-support section that provides steering support using at least one of the piece of map information and the lane image at a time of turning the curve, in which the steering-support section suppresses the steering support without being based on the piece of map information when the steering-support section detects an end point of the curve on a basis of the lane image.

According to the present application, when the end point of the curve is recognized on the basis of the lane image, the steering support is suppressed without being based on the piece of map information on the curve. For this reason, the steering support can be suppressed with higher accuracy than in a case where the end point of the curve is recognized on the basis of the piece of map information to cause an error.

A time when the steering support starts being suppressed corresponds to a time point when the end point of the curve is detected. For this reason, the time can be made to coincide with a time when a driver ends steering involved in the turning of the curve and starts returning a steering wheel to an original position. It is thus possible to suppress the steering support in accordance with a sense of a driver.

The steering-support section may calculate an approximate curve for the lane on a basis of the lane image, and may detect the end point of the curve if the steering-support section judges that a difference in slope between tangents at two points on the approximate curve is not more than a predetermined difference threshold and that the approximate curve lies in a straight-ahead direction of the vehicle. This allows relatively easy detection of the end point of the curve using the lane image.

The steering-support section may extract edge feature points from the lane image, approximate the edge feature point corresponding to a portion behind the vehicle of the lane to a quadratic curve, approximate the edge feature point corresponding to a portion ahead of the vehicle of the lane to a straight line, calculate a distance between the quadratic curve and the straight line for each of points on the quadratic curve, and set the point, at which the distance between the quadratic curve and the straight line is not more than a distance threshold, as the end point of the curve. This allows relatively easy detection of the end point of the curve using the lane image.

The running-support system may further include an actuator that assists in steering, and the steering-support section may start suppression of output production by the actuator involved in the steering support at a time when the steering-support section detects the end point of the curve on a basis of the lane image. With this configuration, a time when a driver ends steering involved in the turning of the curve and starts returning a steering wheel to an original position can be made to coincide with a time when the suppression of the output production by the actuator involved in the steering support is started. It is thus possible to end the steering support in accordance with a sense of a driver.

A first point of the two points on the approximate curve may be set ahead by a predetermined distance of the vehicle, and a second point may be set closer to the vehicle than the first point. It is thus possible to detect the end point of the curve by judging arrival of the end point of the curve at the first point.

If the at least one lane includes two lanes, only a first lane of the two lanes is included in the lane image, and a second lane is not included in the lane image, the steering-support section may suppress the steering support without being based on the piece of map information when the steering-support section detects the end point of the curve on a basis of an image of the first lane. With this configuration, even in a case of running around the curve only with the lane on one side (the first lane) or a case of running around the curve with a small radius which disables the image pickup section to pick up an image of the other lane (the second lane) until arrival at the end point, the end point of the curve can be detected.

The steering-support section may judge a deviation of a time when an operation of returning a steering wheel is started by a driver from a time when the steering support is suppressed, and may correct the time when the steering support is suppressed in accordance with the deviation. This makes it possible to suppress the steering support in accordance with a sense of a driver.

The steering-support section may detect a position of the end point of the curve at predetermined time intervals a plurality of times, perform correction to change each of a plurality of detection values of the position of the end point of the curve to a position at a same time point in accordance with a movement direction and a movement distance of the vehicle, and determine the position of the end point of the curve on a basis of values obtained by weighing the plurality of detection values changed in accordance with differences from a most recent value or the time interval. Since the position of the end point of the curve is determined on the basis of the plurality of detection values, the position of the end point of the curve can be detected with higher accuracy.

The steering-support section may calculate the values obtained by weighing the plurality of detection values changed in accordance with the differences from the most recent value or the time interval, calculate a plurality of Gaussian distribution functions with the weighed values as respective vertices, calculate a sum of the plurality of Gaussian distribution functions for each of distances from the vehicle, and determine a position at the distance from the vehicle with a maximum one of the sums of the plurality of Gaussian distribution functions as the position of the end point of the curve. Since the position of the end point of the curve is determined using the sum of the Gaussian distribution functions obtained by weighing the plurality of detection values, the position of the end point of the curve can be detected with higher accuracy.

A running-support method according to the present application is a running-support method using a running-support system, the system including a map information acquisition section that acquires a piece of map information on a curve, an image pickup section that picks up a lane image that is an image of at least one lane ahead of a vehicle, and a steering-support section that provides steering support using at least one of the piece of map information and the lane image at a time of turning the curve, in which the steering-support section suppresses the steering support without being based on the piece of map information when the steering-support section detects an end point of the curve on a basis of the lane image, and the steering-support section extracts edge feature points from the lane image, approximates the edge feature point corresponding to a portion behind the vehicle of the lane to a quadratic curve, approximates the edge feature point corresponding to a portion ahead of the vehicle of the lane to a straight line, calculates a distance between the quadratic curve and the straight line for each of points on the quadratic curve, and sets the point, at which the distance between the quadratic curve and the straight line is not more than a distance threshold, as the end point of the curve.

The present application allows provision of more suitable running support at the time of turning a curve.

BRIEF DESCRIPTION OF THE DRAWINGS

FIG. 13 is a view showing respective bird's-eye images before correction and respective bird's-eye images after correction corresponding to a plurality of frames in the curve end point determination process.

FIG. 14 is a figure for explaining a method for determining an end point of a curve using a Gaussian distribution function in the curve end point determination process.

DESCRIPTION OF THE EMBODIMENTS

A. One Embodiment

A1. Description of Overall Configuration
[A1-1. Overall Configuration]

Figure 1:
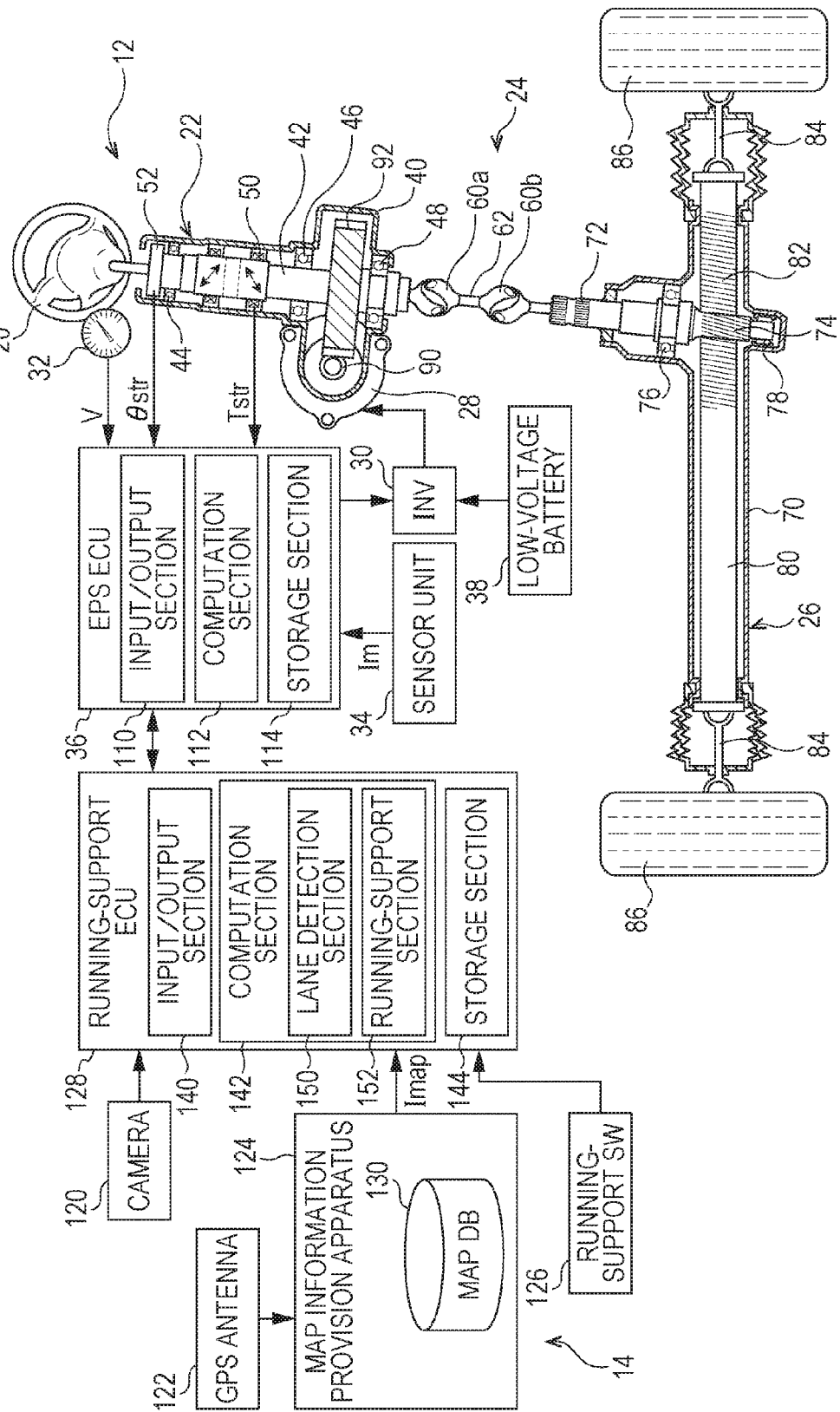
FIG. 1 is a figure of the schematic configuration of a vehicle including a running-support system according to one embodiment of the present application.

FIG. 1 is a figure of the schematic configuration of a vehicle 10 including a running-support system 14 (hereinafter also referred to as a "support system 14") according to one embodiment of the present application. As shown in FIG. 1, the vehicle 10 includes an electric power steering apparatus 12 (hereinafter referred to as an "EPS apparatus 12") in addition to the support system 14.

[A1-2. EPS Apparatus 12]
(A1-2-1. Whole of EPS Apparatus 12)

The EPS apparatus 12 includes a steering wheel 20 (hereinafter also referred to as a "steering 20"), a steering column 22, an intermediate joint 24, a steering gear box 26, a motor 28 for driving the EPS apparatus 12 (hereinafter also referred to as an "EPS motor 28"), an inverter 30 (hereinafter also referred to as an "EPS inverter 30"), a vehicle velocity sensor 32, a sensor unit 34, an electric power steering electronic control unit 36 (hereinafter also referred to as an "EPS ECU 36" or an "ECU 36"), and a low-voltage battery 38 (hereinafter also referred to a "battery 38").

The steering column 22 includes a housing 40, a steering shaft 42 which is supported by bearings 44, 46, and 48 inside the housing 40, a torque sensor 50, and a steering angle sensor 52.

The intermediate joint 24 includes two universal joints 60a and 60b and a shank 62 which is arranged therebetween.

The steering gear box 26 includes a housing 70, a pinion shaft 72 which is provided with a pinion 74 of a rack and pinion mechanism and is supported by bearings 76 and 78, a rack shaft 80 which is provided with rack teeth 82 of the rack and pinion mechanism, and tie rods 84.

(A1-2-2. Manual Steering System)

The steering shaft 42 has one end fixed to the steering wheel 20 and the other end coupled to the universal joint 60a. The universal joint 60a couples the one end of the steering shaft 42 and one end of the shank 62. The universal joint 60b couples the other end of the shank 62 and one end of the pinion shaft 72. The pinion 74 of the pinion shaft 72 engages with the rack teeth 82 of the rack shaft 80 that is reciprocable in a vehicle width direction. Two ends of the rack shaft 80 are coupled to left and right front wheels 86 (steered wheels) via the respective tie rods 84.

Thus, a steering torque Tstr (turning force) produced by a driver operating the steering wheel 20 is transmitted to the pinion shaft 72 via the steering shaft 42 and the intermediate joint 24. The steering torque Tstr is converted by the pinion 74 of the pinion shaft 72 and the rack teeth 82 of the rack shaft 80 into a thrust, and the rack shaft 80 is displaced in the vehicle width direction. With the displacement of the rack shaft 80, the tie rods 84 turn the front wheels 86. This allows change of the orientation of the vehicle 10.

The steering shaft 42, the intermediate joint 24, the pinion shaft 72, the rack shaft 80, and the tie rods 84 constitute a manual steering system which directly transmits a steering operation of the steering wheel 20 by a driver to the front wheels 86.

(A1-2-3. Wheel Turning-Assist System)
(A1-2-3-1. Assist Drive System)

The EPS motor 28 is coupled to the steering shaft 42 via a worm gear 90 and a worm wheel gear 92. That is, an output shaft of the EPS motor 28 is coupled to the worm gear 90. The worm wheel gear 92 that engages with the worm gear 90 is formed integrally or elastically at the steering shaft 42 itself.

The EPS motor 28 according to the present embodiment is, for example, of a three-phase AC brushless type but may be any other motor of a three-phase AC brush type, a single-phase AC type, or a DC type. The EPS motor 28 is supplied with power from the low-voltage battery 38 via the EPS inverter 30 controlled by the EPS ECU 36. The EPS motor 28 generates a driving force Fm (hereinafter also referred to as a "motor driving force Fm" or a "steering-assist force Fm") corresponding to the power. The motor driving force Fm is transmitted to the rack shaft 80 via the output shaft of the EPS motor 28, the worm gear 90, the steering shaft 42 (the worm wheel gear 92), the intermediate joint 24, and the pinion shaft 72. The EPS motor 28, the worm gear 90, and the steering shaft 42 (the worm wheel gear 92) constitute an assist drive system which generates a driving force for steering (the steering-assist force Fm).

A steering-assist force Fm in the present embodiment can include components, an input amplifying force Famp and a running-support force Fda. The input amplifying force Famp is a driving force which amplifies a torque (a steering torque Tstr) input from a driver to the steering wheel 20 and acts in the same direction as the steering torque Tstr to aid the driver in steering. As will be described later, a driving force opposite in direction to the input amplifying force Famp may also be generated. The running-support force Fda is a driving force which is generated and acts independently of the steering torque Tstr in order to support the vehicle 10 in running (in particular, turning of a curve 304 (for example, FIG. 4)).

(A1-2-3-2. Assist Control System)

The torque sensor 50, the vehicle velocity sensor 32, the EPS inverter 30, the sensor unit 34, and the EPS ECU 36 constitute an assist control system which controls the assist drive system. In the description below, a combination of the assist drive system, the assist control system, and the low-voltage battery 38 will be referred to as a wheel turning-assist system. In the present embodiment, output from the EPS motor 28 is controlled by so-called vector control using the d-axis and the q-axis.

(a) Feedforward Sensors

The torque sensor 50 detects a torque Tstr (hereinafter also referred to as a "steering torque Tstr") on the steering shaft 42 and outputs the steering torque Tstr to the EPS ECU 36. The vehicle velocity sensor 32 detects a vehicle velocity V [km/h] and outputs the vehicle velocity V to the EPS ECU 36. The steering angle sensor 52 detects a steering angle θstr [degree] indicating a steering amount of the steering wheel 20 and outputs the steering angle θstr to the EPS ECU 36. A steering torque Tstr, the vehicle velocity V, and the steering angle θstr are used for feedforward control in the EPS ECU 36.

(b) EPS Inverter 30

The EPS inverter 30 has a three-phase bridge structure, performs DC/AC conversion, and converts a direct current from the low-voltage battery 38 into a three-phase alternating current and supplies the current to the EPS motor 28.

(c) Feedback Sensors

The sensor unit 34 detects a q-axis current (hereinafter referred to as a "motor current Im") which is a torque current component in the vector control. A motor current Im in the present embodiment has a positive value if a direction of rotation of the motor 28 is a first direction (for example, a direction which rotates the vehicle 10 to the right) and has a negative value if the direction of rotation is a second direction (for example, a direction which rotates the vehicle 10 to the left). Note that, if judgment of the first direction and the second direction is possible, a motor current Im only with a positive value may be controlled.

The sensor unit 34 includes a current sensor (not shown) which detects a current with at least two of U-phase, V-phase, and W-phase at windings (not shown) of the EPS motor 28, a resolver (not shown) which detects an electrical angle θ which is a rotation angle of the output shaft (not shown) or an outer rotor of the EPS motor 28, and a q-axis current computation section which computes a q-axis current (a motor current Im) on the basis of a current with the at least two phases and the electrical angle θ. Note that the EPS ECU 36 can bear the function of the q-axis current computation section.

(d) EPS ECU 36

As shown in FIG. 1, the EPS ECU 36 has a hardware configuration with an input/output section 110, a computation section 112, and a storage section 114. The EPS ECU 36 controls the output from the EPS motor 28 via the EPS inverter 30 on the basis of values output from the sensors. The computation section 112 executes steering-assist control that controls a steering-assist force Fm (=a motor driving force Fm) for assisting a driver in steering.

(A1-2-3-3. Low-Voltage Battery 38)

The low-voltage battery 38 is an electric storage device which can output a low voltage (12 volts in the present embodiment), and a secondary battery, such as a lead battery, can be used as the low-voltage battery 38.

[A1-3. Running-Support System 14]

As shown in FIG. 1, the running-support system 14 includes a front camera 120 (hereinafter also referred to as a "camera 120"), a GPS antenna 122, a map information provision apparatus 124, a running-support switch 126, and a running-support electronic control unit 128 (hereinafter referred to as a "running-support ECU 128" or an "ECU 128").

The camera 120 is attached to the inside of a front windshield in front of a back mirror. When the running-support switch 126 is on, the camera 120 captures lanes 302*l* and 302*r* (for example, FIG. 4) on two sides on a road surface ahead as an image (a forward image 200 (for example, FIG. 6)). The camera 120 outputs a piece Ic of image information on the forward image 200 to the running-support ECU 128.

The GPS antenna 122 receives signals (GPS signals) from a plurality of GPS satellites over the vehicle 10 and outputs the signals to the map information provision apparatus 124.

The map information provision apparatus 124 identifies a current position Pc of the vehicle 10 on the basis of output from the GPS antenna 122 and provides a piece of information (hereinafter also referred to as a "piece Imap of map information") on the current position Pc and its surroundings to the running-support ECU 128. The piece Imap of map information includes a radius R (hereinafter also referred to as a "curve radius R") of a curve 304 and a distance Lin (hereinafter also referred to as a "start point distance Lin") to an entrance of the curve 304, in addition to the current position Pc.

The piece Imap of map information is stored in a map information database 130 (hereinafter referred to as a "map DB 130") of the map information provision apparatus 124. The map information provision apparatus 124 identifies the current position Pc of the vehicle 10 on the basis of a GPS signal received by the GPS antenna 122. The map information provision apparatus 124 also reads out the piece Imap of map information from the map DB 130 on the basis of the current position Pc and provides the piece Imap of map information to the EPS ECU 36.

Figure 6:
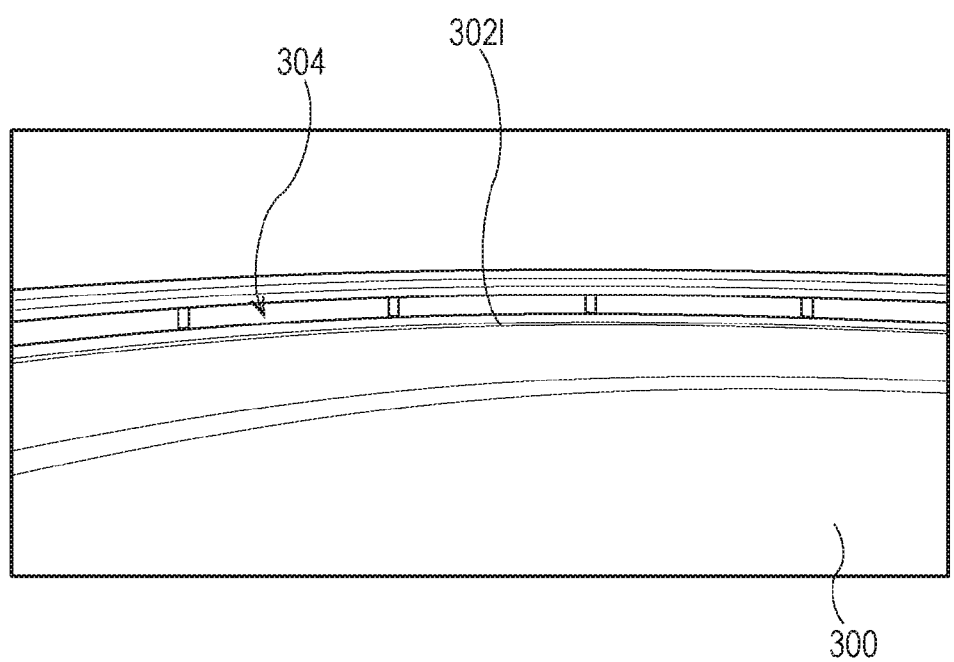
FIG. 6 is a view showing one example of a forward image when the vehicle is running around the curve.
Figure 7:
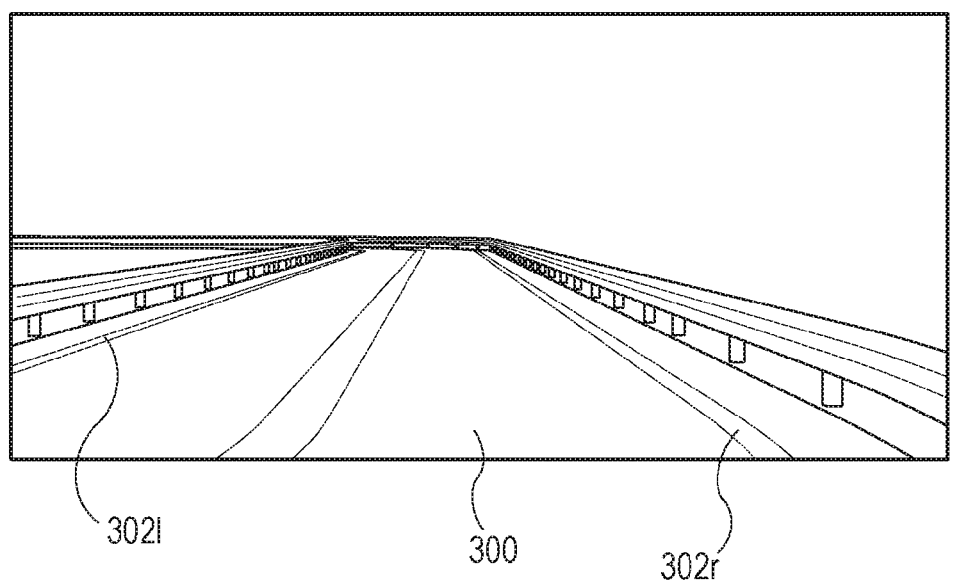
FIG. 7 is a view showing one example of a forward image when the vehicle arrives at an end point of the curve.

The running-support ECU 128 has a hardware configuration with an input/output section 140, a computation section 142, and a storage section 144. The ECU 128 detects the lanes 302*l* and 302*r* (FIGS. 4 to 7) on the two sides of the vehicle 10 from the forward image 200 (a camera image) acquired by the camera 120. The ECU 128 controls the EPS motor 28 to aid the vehicle 10 in running, for example, along one side or the center of the lane 302*l* or 302*r*. Note that a simplified representation without any clear indication of a running lane of the vehicle 10 and an oncoming lane is shown in each of FIGS. 4 and 5. FIGS. 6 and 7 show an example in which the vehicle 10 drives on the right.

The input/output section 140 (a map information acquisition section) does input and output from and to the sections of the vehicle 10. The computation section 142 controls the whole running-support system 14 and includes a lane detection section 150 and a running-support section 152. The lane detection section 150 detects the lanes 302*l* and 302*r* displayed on a running road 300 (FIGS. 4 to 6) of the vehicle 10 from the piece Ic of image information (the forward image 200) acquired by the camera 120. The running-support section 152 executes running-support control that aids in maintaining the vehicle 10 between the lanes 302*l* and 302*r*. Note that the running-support control according to the present embodiment is executed when the vehicle velocity V is within the range of, for example, 30 to 120 [km/h].

A2. Various Types of Control

[A2-1. Overview]

Control in the EPS ECU 36 and the running-support ECU 128 according to the present embodiment will be described. The EPS ECU 36 executes the steering-assist control. The running-support ECU 128 executes the running-support control including curve turning-support control. The curve turning-support control is control that adjusts a running-support force Fda to support the vehicle 10 in turning the curve 304.

[A2-2. Steering-Assist Control]

Figure 2:
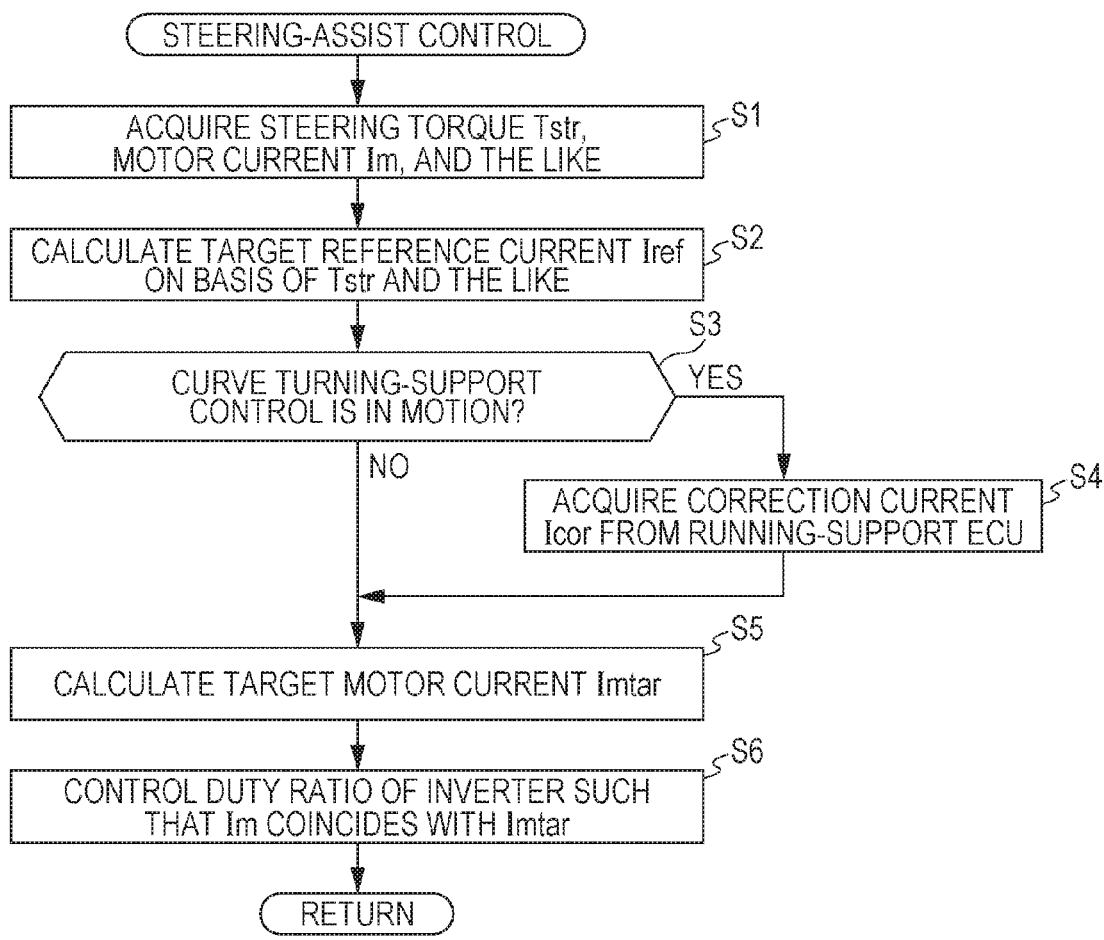
FIG. 2 is a flowchart of steering-assist control according to the embodiment.

FIG. 2 is a flowchart of the steering-assist control according to the present embodiment. As described above, the steering-assist control controls a steering-assist force Fm for assisting a driver in steering. The steering-assist force Fm can include components, an input amplifying force Famp and a running-support force Fda. The steering-assist force Fm is expressed as torque and is identical in direction to a steering torque Tstr of a driver. Alternatively, as will be described later, the steering-assist force Fm may be opposite in direction to the steering torque Tstr of the driver and may be made to act as a reaction force. The EPS ECU 36 repeats the process in FIG. 2 at predetermined first computation intervals (for example, intervals of several microseconds to several hundreds of milliseconds).

In step S1 in FIG. 2, the EPS ECU 36 acquires the steering torque Tstr, a motor current Im, and the like. Examples of a necessary value other than the steering torque Tstr and the motor current Im include a value (for example, a vehicle yaw rate Yr or a lateral acceleration G) needed to generate the steering-assist force Fm in the conventional EPS apparatus 12.

In step S2, the EPS ECU 36 calculates a target reference current Iref on the basis of the steering torque Tstr and the like. The target reference current Iref is a value of the motor current Im which corresponds to the input amplifying force Famp and basically increases in absolute value with an increase in an absolute value of the steering torque Tstr. Note that so-called inertia control, so-called damper control, or the like may be used to calculate the target reference current Iref.

In step S3, the EPS ECU 36 communicates with the running-support ECU 128 and judges whether the curve turning-support control is in motion in the running-support ECU 128. If the curve turning-support control is not in motion (NO in S3), the flow advances to step S5.

If the curve turning-support control is in motion (YES in S3), the EPS ECU 36 acquires a correction current Icor for correcting the target reference current Iref from the running-support ECU 128 in step S4. The correction current Icor is a correction value for the motor current Im for the curve turning-support control in the running-support ECU 128 and corresponds to the running-support force Fda. The details of the correction current Icor will be described later with reference to, for example, FIG. 3.

After step S3 or S4, in step S5, the EPS ECU 36 calculates a target motor current Imtar. That is, if the correction current Icor is not acquired from the running-support ECU 128, the EPS ECU 36 directly sets the target reference current Iref as the target motor current Imtar (Imtar←Iref). If the correction current Icor is acquired from the running-support ECU 128, the EPS ECU 36 adds the correction current Icor to the target reference current Iref and sets the sum as the target motor current Imtar (Imtar←Iref+Icor).

In step S6, the EPS ECU 36 controls a duty ratio of the inverter 30 to change the output from the motor 28 such that the motor current Im coincides with the target motor current Imtar.

[A2-3. Curve Turning-Support Control]
(A2-3-1. Overall Flow of Curve Turning-Support Control)

Figure 3:
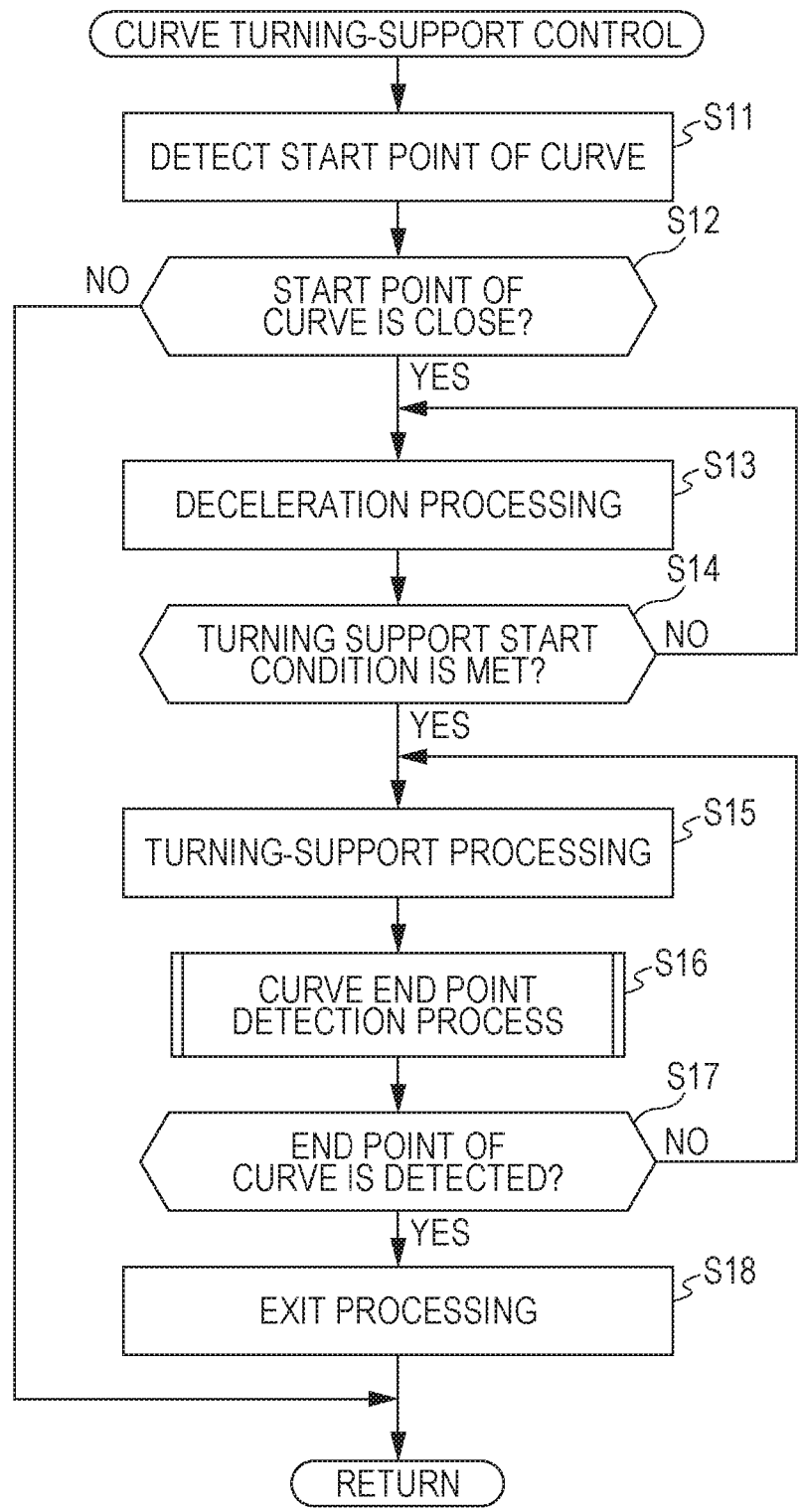
FIG. 3 is a flowchart of curve turning-support control according to the embodiment.

FIG. 3 is a flowchart of the curve turning-support control according to the present embodiment. As described above, the curve turning-support control is control that adjusts a running-support force Fda to support the vehicle 10 in turning the curve 304. The running-support force Fda is expressed as torque and is identical in direction to a steering torque Tstr of a driver. Alternatively, as will be described later, a steering-assist force Fm may be opposite in direction to the steering torque Tstr of the driver and may be made to act as a reaction force. The running-support ECU 128 repeats the process in FIG. 3 at predetermined second computation intervals (for example, intervals of several microseconds to several hundreds of milliseconds).

In step S11 in FIG. 3, the running-support ECU 128 detects a start point Pin (entrance) of the curve 304. For example, the ECU 128 performs edge detection within the forward image 200 and detects the lanes 302*l* and 302*r*. The ECU 128 then calculates tangents to the lanes 302*l* and 302*r* and detects, as the start point Pin, a point at which the slopes of the tangents to the lanes 302*l* and 302*r* are not less than a predetermined angle threshold. Alternatively, the ECU 128 may detect the start point Pin on the basis of the start point distance Lin included in a piece Imap of map information.

In step S12, the ECU 128 judges whether the start point Pin of the curve 304 has become close. More specifically, the ECU 128 judges whether the start point distance Lin has become not more than a distance threshold TH11. If the start point Pin has not become close (NO in S12), the ECU 128 ends the process this time and returns to step S11. On the other hand, if the start point Pin has become close (YES in S12), the ECU 128 executes deceleration processing in step S13.

The deceleration processing is a process of decelerating the vehicle 10 such that the vehicle velocity V is a curve turning target vehicle velocity Vcvtar when the vehicle 10 arrives at the start point Pin. The curve turning target vehicle velocity Vcvtar is a target value for the vehicle velocity V which is calculated on the basis of the radius R and a speed limit of the curve 304. At the time of the deceleration processing, the ECU 128 sets a target deceleration Dtar on the basis of the relationship between the start point distance Lin and the vehicle velocity V and decelerates the vehicle 10 such that (an absolute value of) an actual deceleration D is not less than (an absolute value of) the target deceleration Dtar. At the time of the deceleration of the vehicle 10, the ECU 128 uses a friction braking device (and/or an engine brake and/or a regenerative brake) (not shown).

In step S14, the ECU 128 judges whether a turning support start condition is met. As the turning support start condition, for example, the condition that a driver has operated the steering 20, the condition that the vehicle 10 has arrived at the start point Pin of the curve 304, or the condition that the vehicle 10 has arrived at a predetermined distance from the start point Pin can be used.

If the turning support start condition is not met (NO in S14), the ECU 128 repeats step S13. On the other hand, if the turning support start condition is met (YES in S14), the flow advances to step S15.

In step S15, the ECU 128 executes turning-support processing that supports the vehicle 10 in turning the curve 304. In the turning-support processing, the ECU 128 calculates a target yaw rate Ytar on the basis of the curve radius R included in the piece Imap of map information and the vehicle velocity V from the vehicle velocity sensor 32 (Ytar=V/R). The ECU 128 then calculates the correction current Icor for the EPS motor 28 such that an actual yaw rate Y of the vehicle 10 is equal to the target yaw rate Ytar. Note that the curve radius R may be calculated using a piece Ic of image information.

In succeeding step S16, the ECU 128 executes a curve end point detection process of detecting an end point Pout (exit) of the curve 304 using the forward image 200 from the piece Ic of image information. The details of the curve end point detection process will be described later with reference to FIGS. 5 to 8.

In step S17 in FIG. 3, the ECU 128 judges whether the end point Pout of the curve 304 has been detected by the curve end point detection process. If the end point Pout has not been detected (NO in S17), the flow returns to step S15. On the other hand, if the end point Pout has been detected (YES in S17), the flow advances to step S18.

In step S18, the ECU 128 executes exit processing at the time of leaving the curve 304. In the exit processing, the ECU 128 reduces the correction current Icor (see FIG. 4).

Figure 4:
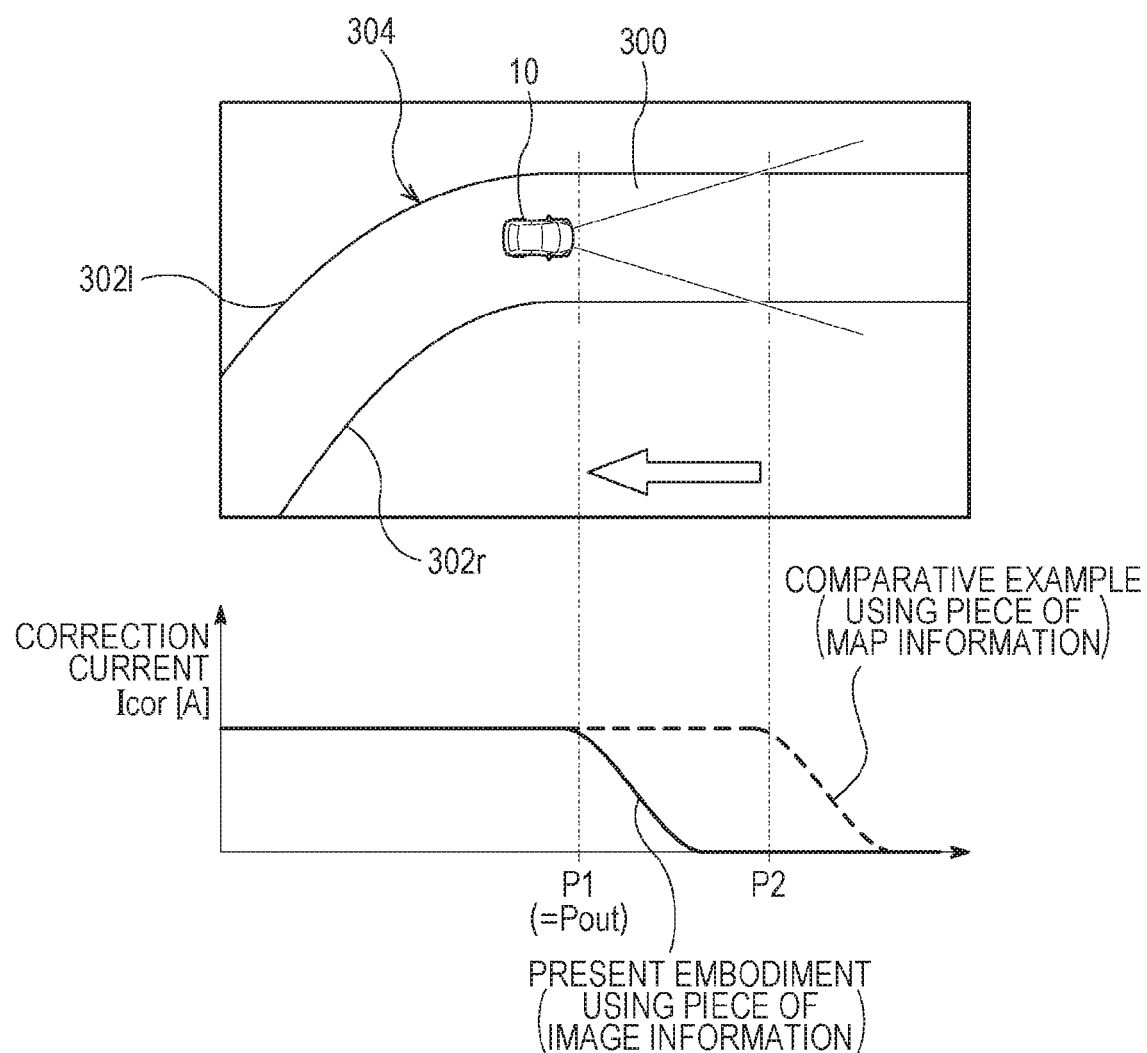
FIG. 4 is a figure for explaining a difference between a case where the curve turning-support control according to the embodiment is used and a case where curve turning-support control according to a comparative example is used.

FIG. 4 is a figure for explaining a difference between a case where the curve turning-support control according to the present embodiment is used and a case where curve turning-support control according to a comparative example is used. In the comparative example, the end point Pout of the curve 304 is detected using a piece Imap of map information. In the present embodiment, the end point Pout of the curve 304 is detected at a point P1 through use of a piece Ic of image information, and the correction current Icor is then reduced by the exit processing (S18 in FIG. 3). In contrast, in the comparative example, the end point Pout of the curve 304 is detected at a point P2 (=the end point Pout) through the use of the piece Imap of map information, and the correction current Icor is then reduced.

In the comparative example, if the accuracy of the piece Imap of map information is low, a time when the turning-support control ends may deviate from a time when the vehicle 10 arrives at the end point Pout of the curve 304. In contrast, in the present embodiment, use of the piece Ic of image information allows a time when the turning-support control ends and a time when the vehicle 10 arrives at the end point Pout of the curve 304 to coincide with each other. In other words, in the present embodiment, support in turning of the curve 304 using a piece of information on the radius R included in a piece Imap of map information can be ended at the end point Pout of the curve 304 that is detected on the basis of the piece Ic of image information. It is thus possible to end the turning-support processing with high accuracy.

(A2-3-2. Curve End Point Detection Process)

(A2-3-2-1. Basic Concept)

Figure 5:
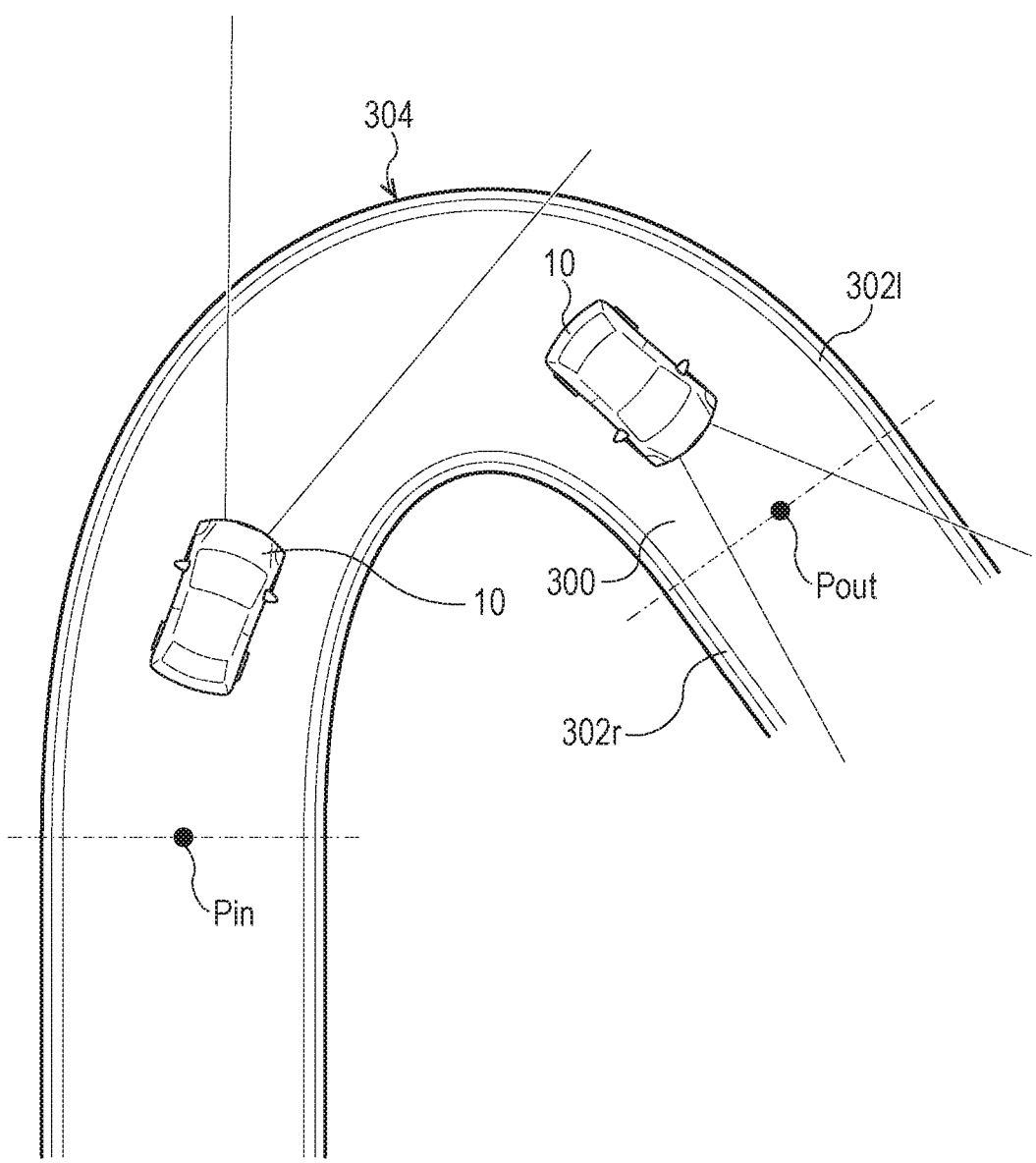
FIG. 5 is a bird's-eye view showing how the vehicle runs around a curve.

FIG. 5 is a bird's-eye view showing how the vehicle 10 runs around the curve 304. FIG. 6 is a view showing one example of the forward image 200 when the vehicle 10 is running around the curve 304. FIG. 7 is a view showing one example of the forward image 200 when the vehicle 10 arrives at the end point Pout of the curve 304. The curve 304 in FIG. 5 has the relatively small radius R. FIGS. 6 and 7 show examples when the vehicle 10 is driving on the right.

The inventor of the present application has analyzed driving acts of drivers to make a finding that many drivers during running around a curve tend to end operation of the steering wheel 20 for running around a curve and start returning the steering wheel 20 to the original position (or to end running around the curve 304) when a portion ahead of the running road 300 seems straight.

For example, when the vehicle 10 is running around the curve 304, as in FIG. 6, the running road 300 does not seem straight. For this reason, a driver continues operation of the steering wheel 20 for running around a curve. If the running road 300 of the vehicle 10 seems straight, as in FIG. 7, the driver ends the operation of the steering wheel 20 for running around a curve and starts returning the steering wheel 20 to the original position.

In the present embodiment, the end point Pout of the curve 304 is considered to have been detected on the basis of a piece Ic of image information at a time when the running road 300 starts to seem straight, and the curve turning-support processing is ended. This makes a time when a driver ends steering for running around a curve to coincide with a time when the turning-support processing is ended. It is thus possible to implement provision of running support without giving any uncomfortable feeling to a driver.

(A2-3-2-2. Specific Processing)

Figure 8:
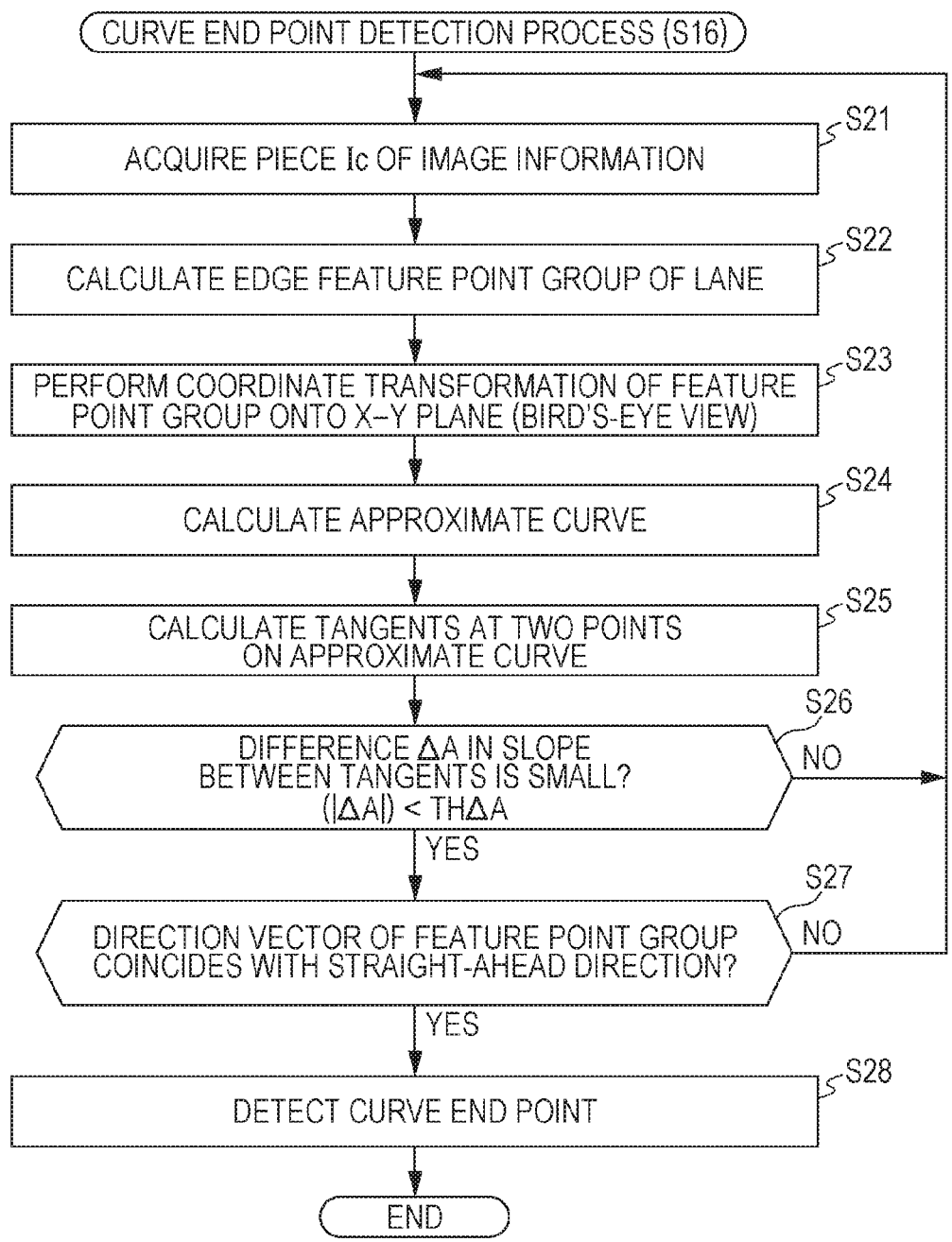
FIG. 8 is a flowchart of a curve end point detection process according to the embodiment.
Figure 9:
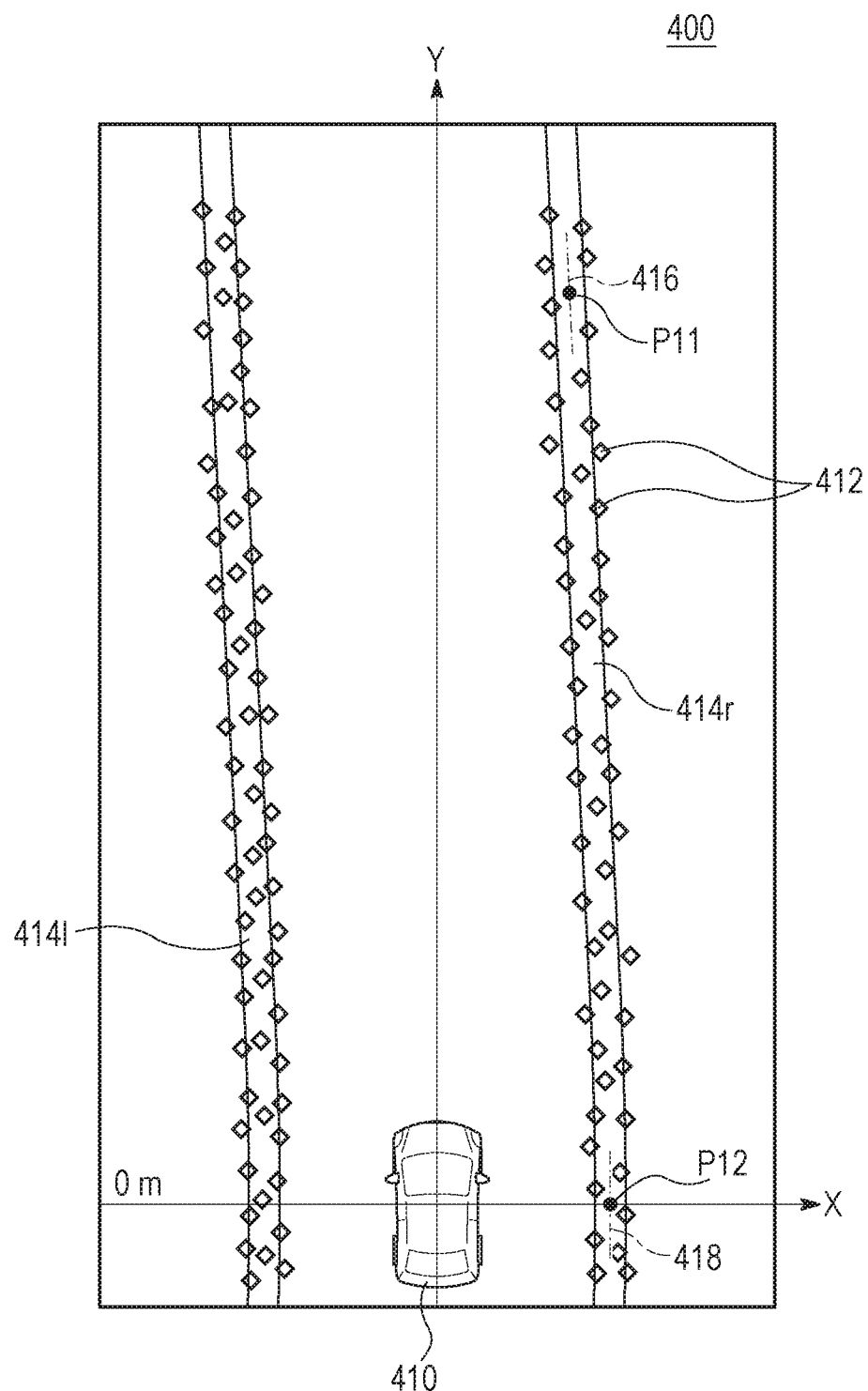
FIG. 9 is a bird's-eye view showing one example of a processing screen for the curve end point detection process according to the embodiment.

FIG. 8 is a flowchart (the details of S16 in FIG. 3) of the curve end point detection process according to the present embodiment. FIG. 9 is a bird's-eye view showing one example of a processing screen 400 for the curve end point detection process according to the present embodiment. In FIG. 9, an icon 410 is an icon (hereinafter also referred to as an "ego-vehicle icon 410") indicating the vehicle 10 (ego-vehicle). In FIG. 9, the center of the ego-vehicle icon 410 is set as the origin, the width direction of the vehicle 10 is set as the X-axis, and a longitudinal direction of the vehicle 10 is set as the Y-axis. The processing screen 400 in FIG. 9 is shown for ease of comprehension, and the actual vehicle 10 need not generate the processing screen 400.

In step S21 in FIG. 8, the ECU 128 acquires a piece Ic of image information from the camera 120. In step S22, the ECU 128 calculates an edge feature point group Gc (hereinafter also referred to as a "feature point group Gc") of the lanes 302$l$ and 302$r$ on the basis of the piece Ic of image information. The feature point group Gc is a group of edge feature points 412 (hereinafter also referred to as "feature points 412") of the lanes 302$l$ and 302$r$.

In step S23, the ECU 128 performs a coordinate transformation of (projects) the feature point group Gc (or the feature points 412) onto the X-Y plane (a bird's-eye view) (see FIG. 9). In step S24, the ECU 128 calculates approximate curves 414$l$ and 414$r$ (hereinafter collectively called "approximate curves 414") on the basis of the feature point group Gc. The approximate curve 414 is set as, for example, a quadratic curve, a perfect circle with the radius R, or a clothoid curve. Although the example in FIG. 9 is an example in which the two left and right approximate curves 414$l$ and 414$r$ are detected, either one may be calculated. If the feature points 412 are detected only for one of the lanes 302$l$ and 302$r$, computation is performed using the approximate curve 414 based on the feature points 412 for the one.

In step S25, the ECU 128 calculates tangents 416 and 418 at two particular points P11 and P12 on the approximate curves 414$l$ and 414$r$. In the present embodiment, the point P11 (a first point) is set at a position at a predetermined distance from the ego-vehicle icon 410 (for example, a position corresponding to a distance of 10 to 100 m). The point P12 (a second point) is set close to the ego-vehicle icon 410 (on the X-axis in particular). In other words, the points P11 and P12 are set at y-coordinates of predetermined values Y1 and Y2. Note that, although the tangents 416 and 418 are calculated only for the approximate curve 414$r$ corresponding to the right lane 302$r$ in FIG. 9, the tangents 416 and 418 can be calculated for the approximate curve 414$l$ corresponding to the left lane 302$l$.

The point P11 may be switched in accordance with the vehicle velocity V [km/h] of the vehicle 10. For example, if the vehicle velocity V is high, the point P11 may be set farther away from the vehicle 10. On the other hand, if the vehicle velocity V is low, the point P11 may be closer to the vehicle 10.

In step S26, the ECU 128 judges whether a difference ΔA in slope A between the tangents 416 and 418 is small. More specifically, the ECU 128 judges whether an absolute value |ΔA| of the difference ΔA is less than a threshold THΔA. The threshold THΔA is, for example, a threshold for judging whether the point P11 corresponds to the end point Pout of the curve 304.

If the difference ΔA is small (YES in S26), the ECU 128 judges in step S27 whether a direction vector of the feature point group Gc (or the approximate curves 414$l$ and 414$r$) coincides with a straight-ahead direction of the vehicle 10. In other words, the ECU 128 judges whether the approximate curves 414$l$ and 414$r$ lie in a traveling direction of the vehicle 10. Note that whether the direction vector of the feature point group Gc coincides with or approximates the straight-ahead direction or not may be judged instead of whether the direction vector of the feature point group Gc coincides with the straight-ahead direction of the vehicle 10.

If the direction vector of the feature point group Gc coincides with the straight-ahead direction (YES in S27), the ECU 128 judges in step S28 that the end point Pout of the curve 304 has been detected.

If the difference ΔA in slope A between the tangents 416 and 418 is not small (NO in S26), the vehicle 10 can be said not to have arrived at the end point Pout of the curve 304. If the direction vector of the feature point group Gc does not coincide with the straight-ahead direction (NO in S27), the detected feature point group Gc (or the approximate curves 414$l$ and 414$r$) is (are) considered to be associated with a side road or the like. In either case (NO in S26 or NO in S27), the flow returns to step S21.

A3. Advantageous Effects of Present Embodiment

As has been described above, according to the present embodiment, when the end point Pout of the curve 304 is recognized on the basis of a piece Ic of image information (a lane image), steering support is suppressed without being based on a piece Imap of map information on the curve 304 (YES in S17→S18 in FIG. 3). For this reason, steering support can be suppressed with higher accuracy than in a case where the end point Pout of the curve 304 is recognized on the basis of the piece Imap of map information to cause an error (see FIG. 4).

A time when steering support starts being suppressed corresponds to a time point when the end point Pout of the curve 304 is detected (YES in S17). For this reason, the time can be made to coincide with a time when a driver ends steering involved in turning of the curve 304 and starts returning the steering wheel 20 to the original position. It is thus possible to suppress steering support in accordance with a sense of a driver.

In the present embodiment, the running-support ECU 128 (a steering-support section) calculates the approximate curves 414$l$ and 414$r$ of the lanes 302$l$ and 302$r$ on the basis of a piece Ic of image information (a lane image) (S24 in FIG. 8). If the ECU 128 judges that the difference $\Delta A$ in slope A between the tangents 416 and 418 at the two points P11 and P12 on the approximate curves 414$l$ and 414$r$ is not more than the predetermined difference threshold TH$\Delta A$ (YES in S26) and that the approximate curves 414$l$ and 414$r$ lie in the straight-ahead direction of the vehicle 10 (YES in S27), the ECU 128 detects the end point Pout of the curve 304 (S28). This allows relatively easy detection of the end point Pout of the curve 304 using the piece Ic of image information.

In the present embodiment, the running-support system 14 includes the motor 28 (an actuator) that assists in steering (FIG. 1). The ECU 128 (the steering-support section) starts suppressing output production by the motor 28 involved in steering support at a time when the ECU 128 detects the end point Pout of the curve 304 on the basis of a piece Ic of image information (a lane image) (YES in S17→S18 in FIG. 3).

With the above-described configuration, a time when a driver ends steering involved in turning of the curve 304 and starts returning the steering wheel 20 to the original position can be made to coincide with a time when suppression of output production by the motor 28 involved in steering support is started. It is thus possible to end steering support in accordance with a sense of a driver.

In the present embodiment, the point P11 (the first point) of the two points P11 and P12 on the approximate curve 414$r$ is set ahead by a predetermined distance of the vehicle 10, and the point P12 (the second point) is set closer to the vehicle 10 than the point P11 (FIG. 9). It is thus possible to detect the end point Pout of the curve 304 by judging arrival of the end point Pout of the curve 304 at the point P11.

In the present embodiment, if only one (a first lane) of the two lanes 302$l$ and 302$r$ is included in a piece Ic of image information (a lane image), and the other (a second lane) is not included in the piece Ic of image information, the ECU 128 (the steering-support section) suppresses steering support without being based on a piece Imap of map information when the ECU 128 detects the end point Pout of the curve 304 on the basis of an image of the one (YES in S17→S18 in FIG. 3). With this configuration, even in the case of running around the curve 304 (FIG. 7) only with the lane on one side (the first lane) or the case of running around the curve 304 with the small radius R that disables the camera 120 (an image pickup section) to pick up an image of the lane on the other side (the second lane) until arrival at the end point Pout, the end point Pout of the curve 304 can be detected.

B. Modifications

Note that the present application is not limited to the above-described embodiment and can, of course, adopt various types of configurations on the basis of the description of the present specification. For example, the configurations below can be adopted.

B1. Object to be Installed

In the embodiment, the running-support system 14 (a running-support apparatus) is installed in the vehicle 10 (FIG. 1). The present application, however, is not limited to this from the standpoint of, for example, detecting the end point Pout of the curve 304 on the basis of the forward image 200 and providing support in turning of the curve 304 using the curve radius R included in a piece Imap of map information. For example, the present application may be applied to a moving object including the steering 20 (or a handler).

B2. EPS Apparatus 12

[B2-1. Overall Configuration of EPS Apparatus 12]

The EPS apparatus 12 according to the embodiment is configured such that the EPS motor 28 transmits a steering-assist force Fm to the steering shaft 42 (is a so-called column-assist type EPS apparatus). The configuration of the EPS apparatus 12, however, is not limited to this, and any configuration will do as long as the EPS apparatus 12 generates the steering-assist force Fm. For example, any one of a pinion-assist type EPS apparatus, a dual pinion-assist type EPS apparatus, a rack-assist type EPS apparatus, and an electro-hydraulic power steering apparatus may be adopted. Note that an electro-hydraulic power steering apparatus creates oil pressure by a motor pump and generates the steering-assist force Fm with the oil pressure.

In the embodiment, the EPS apparatus 12 adopts a configuration in which a steering torque Tstr of a driver is directly transmitted to the front wheels 86 (hereinafter also referred to as a "direct transmission mode"). The present application can also be applied to a steer-by-wire type electric power steering apparatus.

[B2-2. EPS Motor 28]

In the embodiment, the EPS motor 28 is of a three-phase AC brushless type. The present application, however, is not limited to this. For example, the motor 28 may be of a three-phase AC brush type, a single-phase AC type, or a DC type.

In the embodiment, the motor 28 is supplied with power from the low-voltage battery 38 (FIG. 1). In addition to or instead of this, the motor 28 may be supplied with power from an alternator, a fuel cell, or a high-voltage battery.

[B2-3. EPS ECU 36]

The embodiment has been described with installation of the EPS ECU 36 in the vehicle 10 in mind (FIG. 1). However, for example, the ECU 36 may be configured such that a portion of the ECU 36 is provided in a mobile terminal and such that the mobile terminal is connected to a network of the vehicle 10. The same applies to the running-support ECU 128.

B3. Running-Support System 14 (Running-Support Apparatus)

In the embodiment, the running-support system 14 generates a portion of a steering force (a steering torque Tstr)

needed to turn the curve 304. The present application, however, is not limited to this from the standpoint of, for example, detecting the end point Pout of the curve 304 on the basis of the forward image 200. For example, the running-support system 14 is also capable of generating the whole of a steering force (the steering torque Tstr) needed to turn the curve 304 (that is, autonomous driving).

The embodiment has been described with installation of the running-support system 14 in the vehicle 10 in mind (FIG. 1). However, for example, the running-support system 14 may be configured such that a portion (for example, the running-support ECU 128) of the running-support system 14 is provided in a mobile terminal and such that the mobile terminal is connected to a network of the vehicle 10.

The embodiment has described the EPS apparatus 12 and the running-support system 14 as separate components (FIG. 1). However, for example, the function of the running-support system 14 may be included in the EPS apparatus 12. Alternatively, the function of the EPS apparatus 12 may be included in the running-support system 14.

B4. Steering-Assist Control (FIG. 2)

In the steering-assist control according to the embodiment, a driving force (torque) identical in direction to a steering torque Tstr of a driver is generated as a steering-assist force Fm. The present application, however, is not limited to this from the standpoint of, for example, aiding in steering using the steering wheel 20. The steering-assist force Fm may be a force (for example, a reaction force) which acts in a direction opposite to the steering torque Tstr.

The expression "aiding in steering using the steering wheel 20" here refers to both facilitating rotation of the steering wheel 20 in a direction intended by a driver (as in the configuration of the embodiment) and complicating rotation of the steering wheel 20 in a direction intended by a driver if the EPS apparatus 12 adopts a configuration in which the steering torque Tstr is directly transmitted to steered wheels (the front wheels 86) (a direct transmission mode).

B5. Curve Turning-Support Control (Curve End Point Detection Process)

[B5-1. General Remarks]

In the embodiment, the curve end point detection process is executed as a portion of the curve turning-support control. In other words, the curve end point detection process according to the embodiment is based on the assumption that a driver performs steering. The present application, however, is not limited to this from the standpoint of, for example, detecting the end point Pout of the curve 304 on the basis of the forward image 200. It is also possible to apply the curve end point detection process to automatic driving.

[B5-2. Detection of End Point Pout of Curve 304]

In the embodiment, the point P11 corresponding to the tangent 416 (FIG. 9) is set at a position at a predetermined distance from the vehicle 10 (the ego-vehicle icon 410) in a Y-axis direction. The point P12 corresponding to the tangent 418 is set at a position of the center of the vehicle 10 (the ego-vehicle icon 410) in the Y-axis direction (that is, on the X-axis). The positions of P11 and P12, however, are not limited to these from the standpoint of, for example, detecting the end point Pout of the curve 304 on the basis of the difference ΔA in slope A between the tangents 416 and 418.

In the embodiment, suppression of steering support is started (S18 in FIG. 3 and FIG. 4) at a time when the end point Pout of the curve 304 is detected (S17 in FIG. 3). The time, however, may be corrected from the standpoint of, for example, improving the convenience of a driver. For example, the ECU 128 (the steering-support section) judges a deviation of a time when an operation of returning the steering wheel 20 is started by a driver from a time when steering support is suppressed (one or both of a case where the former is earlier and a case where the former is later). The time when steering support is suppressed is corrected in accordance with the deviation. This makes it possible to suppress steering support in accordance with a sense of a driver.

In the embodiment, the end point Pout of the curve 304 is detected on the basis of the difference ΔA in slope A between the tangents 416 and 418 at the points P11 and P12 on the approximate curves 414*l* and 414*r* (FIGS. 8 and 9). The present application, however, is not limited to this from the standpoint of, for example, detecting the end point Pout of the curve 304 using the edge feature points 412 of the lanes 302*l* and 302*r*.

Figure 10:
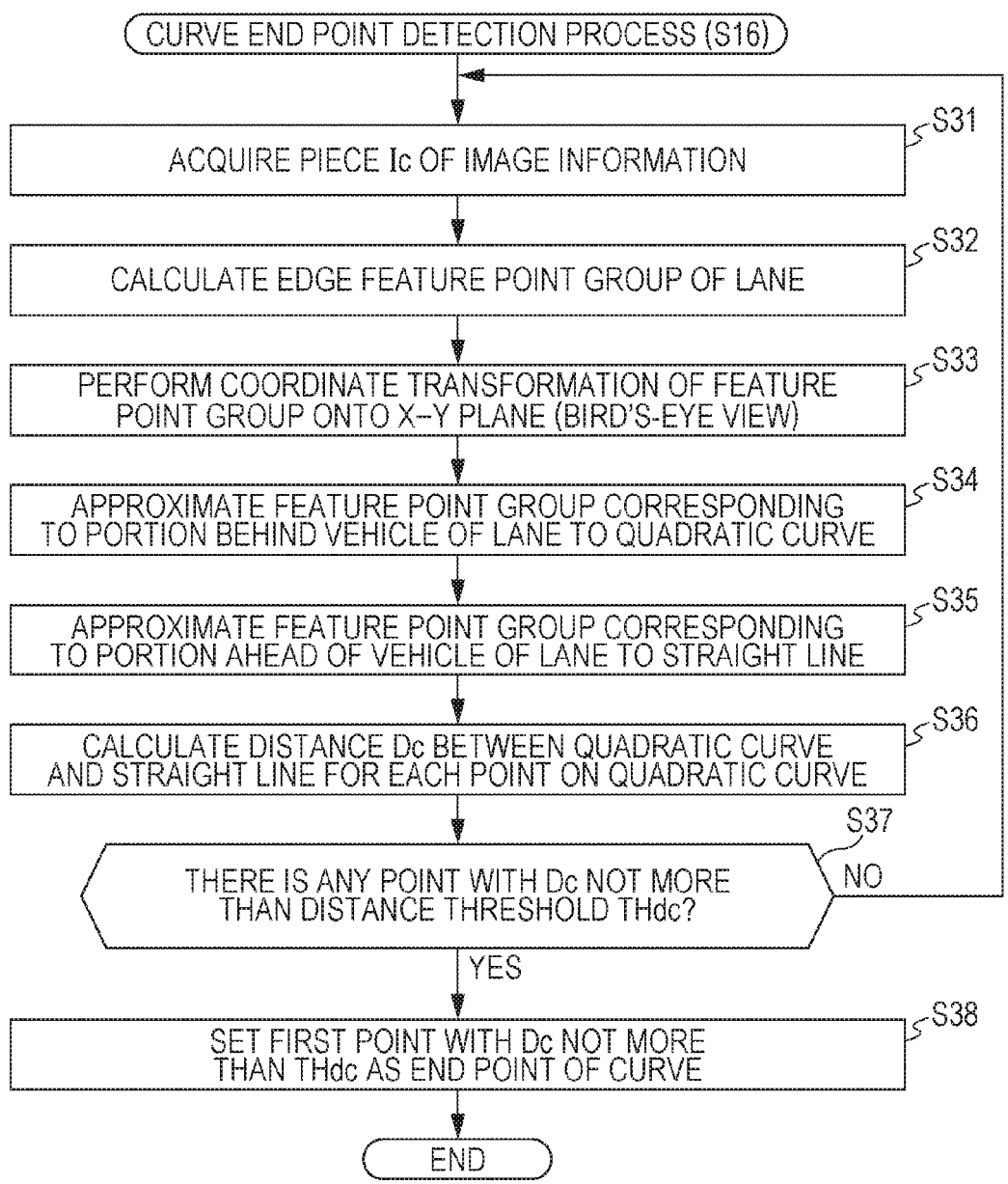
FIG. 10 is a flowchart of a curve end point detection process according to a modification.
Figure 11:
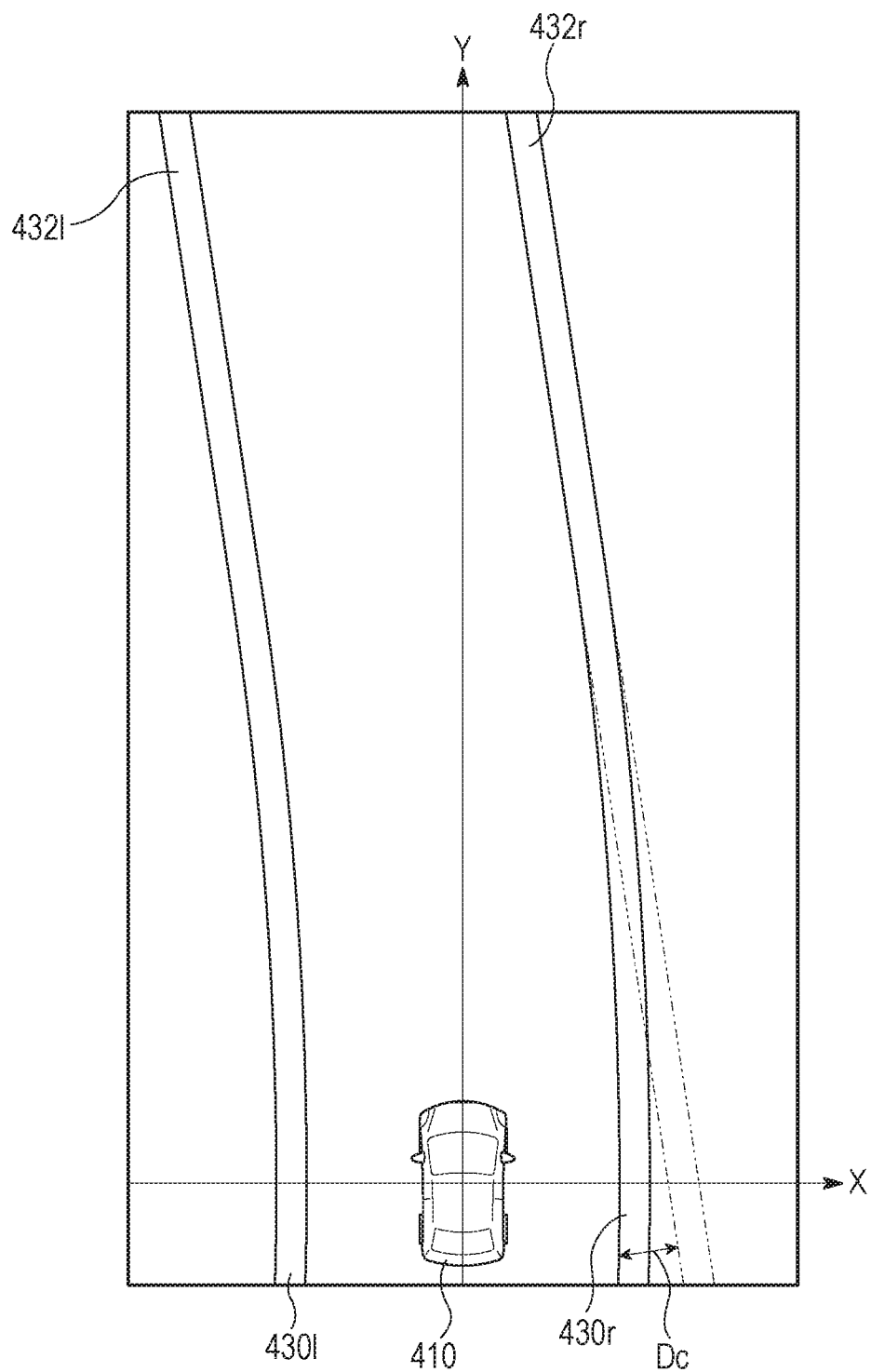
FIG. 11 is a bird's-eye view showing one example of a processing screen for the curve end point detection process according to the modification.

FIG. 10 is a flowchart of a curve end point detection process according to a modification. FIG. 11 is a bird's-eye view showing one example of a processing screen 400*a* for the curve end point detection process according to the modification. The same components as those in the processing screen 400 in FIG. 9 are denoted by the same reference characters, and a detailed description thereof will be omitted.

Steps S31 to S33 in FIG. 10 are the same as steps S21 to S23 in FIG. 8. In step S34, the ECU 128 approximates a feature point group Gc corresponding to portions behind the vehicle 10 of the lanes 302*l* and 302*r* to quadratic curves 430*l* and 430*r*. In step S35, the ECU 128 approximates a feature point group Gc of portions ahead of the vehicle 10 of the lanes 302*l* and 302*r* to straight lines 432*l* and 432*r*.

In step S36, the ECU 128 calculates respective distances Dc between the quadratic curves 430*l* and 430*r* and the straight lines 432*l* and 432*r*. The distances Dc here are defined using, for example, intersections of virtual vertical lines to the straight lines 432*l* and 432*r* and the quadratic curves 430*l* and 430*r*. Alternatively, the distances Dc may be distances in an X-axis direction.

In step S37, the ECU 128 judges whether there is any point, at which the distance Dc is not more than a distance threshold THdc, on the quadratic curves 430*l* and 430*r*. If there is no point, at which the distance Dc is not more than the distance threshold THdc (NO in S37), the flow returns to step S31. If there is any point, at which the distance Dc is not more than the distance threshold THdc (YES in S37), the ECU 128 sets a first point with the distance Dc not more than the distance threshold THdc as an end point Pout of the curve 304 in step S38. Note that a point to be set as the end point Pout is not limited to the first point and that a later point can also be set as the end point Pout of the curve 304.

The modification in FIGS. 10 and 11 allows relatively easy detection of the end point Pout of the curve 304 using a piece Ic of image information (a lane image).

In the above-described embodiment, the exit processing is started (S18) at a time when the end point Pout of the curve 304 is detected once (YES in S17 in FIG. 3). The present application, however, is not limited to this from the standpoint of, for example, enhancing the accuracy of detecting the end point Pout. For example, it is also possible to detect the end point Pout in each of the forward images 200 for a plurality of frames F and weigh values of the end point Pout to determine the end point Pout.

Figure 12:
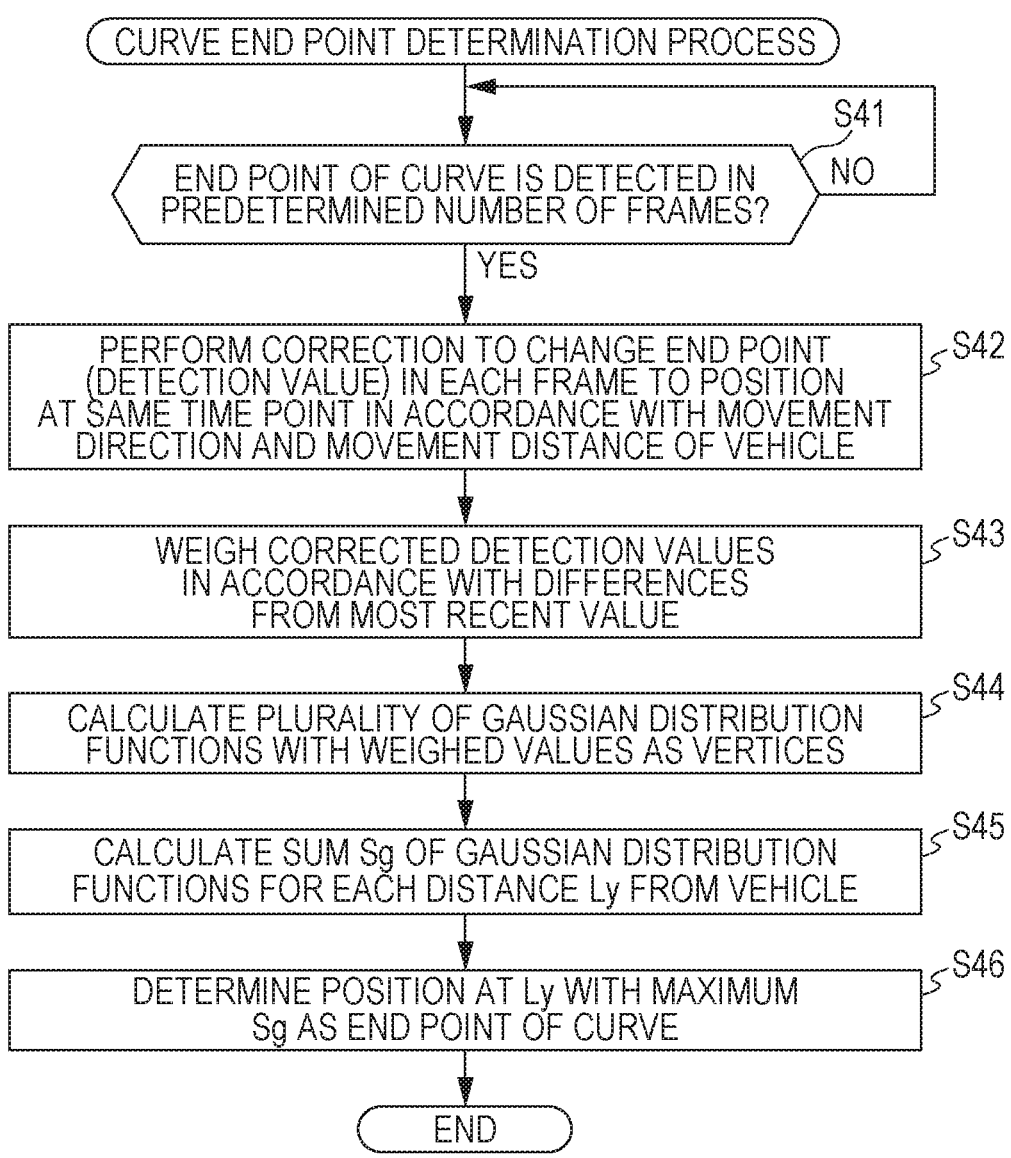
FIG. 12 is a flowchart of a curve end point determination process according to another modification.

FIG. 12 is a flowchart of a curve end point determination process according to another modification. FIG. 13 is a view showing respective bird's-eye images 450 before correction and respective bird's-eye images 450 after correction corresponding to a plurality of frames F in the curve end point determination process. FIG. 14 is a figure for explaining a method for determining an end point Pout of the curve 304 using a Gaussian distribution function G in the curve end point determination process. In FIG. 13, the edge feature points 412 (FIG. 9) are not shown.

In step S41 in FIG. 12, the ECU 128 judges whether the end point Pout of the curve 304 is detected in each of the respective forward images 200 for a predetermined number of frames F. The predetermined number is 3 here, but may be set to any other value (for example, one of 2 and 4 to 10). If the end point Pout of the curve 304 has not been detected in each of the forward images 200 for the predetermined number of frames (NO in S41), the ECU 128 repeats step S41. On the other hand, if the end point Pout of the curve 304 has been detected in each of the forward images 200 for the predetermined number of frames F (frames F1 to F3 in FIG. 13) (YES in S41), the flow advances to step S42.

In step S42, the ECU 128 performs correction to change the end point Pout (a detection value) in each frame F to a position at the same time point in accordance with a movement direction and a movement distance of the vehicle 10.

For example, as shown in FIG. 13, with a transition from the frame F1 to the frame F2 and then to the frame F3, the vehicle 10 moves forward and approaches the end point Pout of the curve 304. For this reason, the relative position of the vehicle 10 to the end point Pout changes (see the upper row in FIG. 13). The ECU 128 changes the frames F1 and F2 to suit a time point corresponding to the frame F3 on the basis of a time interval between frames F, a vehicle velocity V, and a traveling direction (see the lower row in FIG. 13).

Note that the frame F3 is a most recent frame F in the example in FIG. 13. In the upper and lower rows in FIG. 13, end points Pout1 to Pout3 are each the end point Pout for a corresponding one of the frames F1 to F3. In FIG. 13, portions not appearing in the frames F1 and F2 before correction appear in the frames F1 and F2 after correction. The portions do not appear in the bird's-eye images 450 before correction simply for the convenience of illustration, but are actually included in the bird's-eye images 450.

In step S43 in FIG. 12, the ECU 128 weighs the corrected detection values (the end points Pout1 and Pout2) in accordance with differences Do from a most recent value (the end point Pout3). In the example in FIG. 14, the end point Pout1 corresponding to the frame F1 is closer to the end point Pout3 (the most recent value) corresponding to the frame F3 than the end point Pout2 corresponding to the frame F2. For this reason, the end point Pout3 (the most recent value) is weighed the highest, followed by the end point Pout1 and the end point Pout2 in this order.

In step S44, the ECU 128 calculates a plurality of Gaussian distribution functions G (G1 to G3) with the weighed values (the end points Pout1 to Pout3) as respective vertices (see FIG. 14). In succeeding step S45, the ECU 128 calculates a sum Sg of the Gaussian distribution functions G for each distance Ly from the vehicle 10 (see FIG. 14).

In step S46, the ECU 128 determines a position at the distance Ly (Ly_f) with the maximum sum Sg as the position of the end point Pout (an end point Pout_f in FIG. 14) of the curve 304.

In the modification in FIGS. 12 to 14, the position of the end point Pout of the curve 304 is determined on the basis of a plurality of detection values. This allows higher-accuracy detection of the position of the end point Pout of the curve 304.

Additionally, the position of the end point Pout (Pout_f) of the curve 304 is determined using the sum Sg of the Gaussian distribution functions G obtained by weighing a plurality of detection values (the end points Pout1 to Pout3). This allows higher-accuracy detection of the position of the end point Pout (Pout_f) of the curve 304.

Note that weighing is performed on the basis of the difference Do from the end point Pout3 as the most recent value in the modification in FIGS. 12 to 14. The present application, however, is not limited to this from the standpoint of, for example, determining the accurate end point Pout. For example, the end points Pout1 to Pout3 may be weighed in accordance with a time interval. For example, a most recent value may be weighed the highest, and a value farther apart in time from the most recent value (an earlier value) may be weighed lower. Alternatively, all detection values (the end points Pout1 to Pout3) may be equally weighed.

In the modification in FIGS. 12 to 14, the frames F1 and F2 are corrected to suit the time point corresponding to the frame F3 with a most recent value (FIG. 13). The present application, however, is not limited to this from the standpoint of, for example, determining the accurate end point Pout. For example, frames may be corrected to suit a time point corresponding to the frame F1 or F2.

What is claimed is:

1. A running-support system, comprising:
    a map information acquisition section configured to acquire a piece of map information that corresponds to a curve;
    an image pickup section configured to pick up a lane image, wherein the lane image is an image of at least one lane ahead of a vehicle; and
    a steering-support section configured to:
        provide a steering support at a time of the vehicle turning the curve, wherein the steering support is based on at least one of the piece of map information or the lane image,
        suppress the steering support based on a detection of an end point of the curve,
        determine a deviation of a first time when an operation of returning a steering wheel is started by a driver of the vehicle from a second time when the steering support is suppressed, and
        correct the second time when the steering support is suppressed based on the determined deviation.

2. The running-support system according to claim 1, wherein
    the steering-support section is further configured to:
        calculate an approximate curve for the at least one lane based on the lane image, and
        detect the end point of the curve based on a difference in slope between tangents at two points on the approximate curve,
        wherein the difference in slope is equal to or lesser than a difference threshold and the approximate curve lies in a straight-ahead direction of the vehicle.

3. The running-support system according to claim 2, wherein
    a first point of the two points on the approximate curve is set ahead by a distance of the vehicle, and a second point of the two points is set closer to the vehicle than the first point.

4. The running-support system according to claim 1, wherein
    the steering-support section is further configured to:
        extract edge feature points from the lane image,
        approximate the edge feature points corresponding to a first portion behind the vehicle of the at least one lane to a quadratic curve, approximate the edge feature points corresponding to a second portion ahead of the vehicle of the at least one lane to a straight line, calculate a distance between the quadratic curve and the straight line for each of points on the quadratic curve, and set a point, at which the distance between the quadratic curve and the straight line is equal to or lesser than a distance threshold, as the end point of the curve.

5. The running-support system according to claim 1, further comprising:

an actuator configured to assist in steering, wherein the steering-support section is further configured to start suppression of output production by the actuator involved in the steering support at a time of detection of the end point of the curve based on the lane image.

6. The running-support system according to claim 1, wherein if the at least one lane includes two lanes, only a first lane of the two lanes is included in the lane image, and a second lane is excluded in the lane image, the steering-support section is configured to suppress the steering support based on the detection of the end point of the curve and an image of the first lane.

7. The running-support system according to claim 1, wherein the steering-support section is further configured to:

detect a first position of the end point of the curve at time intervals a plurality of times, change each of a plurality of detection values of the first position of the end point of the curve to a second position at a same time point based on a movement direction and a movement distance of the vehicle, and determine the first position of the end point of the curve based on a values obtained by weighing the plurality of detection values changed in accordance with differences from a most recent value or the time intervals.

8. The running-support system according to claim 7, wherein the steering-support section is further configured to:

calculate the values obtained by weighing the plurality of detection values changed in accordance with the differences from the most recent value or the time intervals, calculate a plurality of Gaussian distribution functions with the weighed values as respective vertices, calculate a sum of the plurality of Gaussian distribution functions for each of distances from the vehicle, and determine a third position at the distance from the vehicle with a maximum one of the sums of the plurality of Gaussian distribution functions as the first position of the end point of the curve.

9. A running-support method using a running-support system, the method comprising:

acquiring, by a map information acquisition section, a piece of map information that corresponds to a curve, picking up, by an image pickup section, a lane image, wherein the lane image is an image of at least one lane ahead of a vehicle, and providing, by a steering-support section, steering support at a time of the vehicle turning the curve, wherein the steering support is based on at least one of the piece of map information or the lane image, suppressing, by the steering-support section, the steering support based on a detection of an end point of the curve, extracting, by the steering-support section, edge feature points from the lane image, approximating, by the steering-support section, the edge feature points corresponding to a first portion behind the vehicle of the at least one lane to a quadratic curve, approximating, by the steering-support section, the edge feature points corresponding to a second portion ahead of the vehicle of the at least one lane to a straight line, calculating, by the steering-support section, a distance between the quadratic curve and the straight line for each of points on the quadratic curve, and setting, by the steering-support section, a point, at which the distance between the quadratic curve and the straight line is equal to or lesser than a distance threshold, as the end point of the curve.

* * * * *